(12) United States Patent
Tung et al.

(10) Patent No.: US 9,736,078 B2
(45) Date of Patent: Aug. 15, 2017

(54) RENDEZVOUS FLOW CONTROL APPARATUS, METHOD, AND NON-TRANSITORY TANGIBLE COMPUTER READABLE MEDIUM

(71) Applicant: Institute For Information Industry, Taipei (TW)

(72) Inventors: Yi-Chih Tung, Taipei (TW); Hao-Gen Wong, Taoyuan (TW); Wen-Jyi Hwang, Taipei (TW); Chih-Hsiang Ho, Taipei (TW)

(73) Assignee: Institute For Information Industry, Taipei (TW)

( * ) Notice: Subject to any disclaimer, the term of this patent is extended or adjusted under 35 U.S.C. 154(b) by 101 days.

(21) Appl. No.: 14/732,927

(22) Filed: Jun. 8, 2015

(65) Prior Publication Data

US 2016/0352642 A1    Dec. 1, 2016

(30) Foreign Application Priority Data

May 27, 2015    (TW) .............................. 104116905 A (51) Int. Cl.
  *H04W 72/04*    (2009.01)
  *H04L 12/721*    (2013.01)
  *H04L 12/825*    (2013.01)

(52) U.S. Cl.
  CPC ................................. *H04L 47/263* (2013.01)

(58) Field of Classification Search
  None
  See application file for complete search history.

(56) References Cited

U.S. PATENT DOCUMENTS

| 8,515,444 B1 | 8/2013 | Varma et al. |
| 2002/0174279 A1 | 11/2002 | Wynne et al. |

(Continued)

FOREIGN PATENT DOCUMENTS

| CN | 102572946 A | 7/2012 |
| TW | 201234812 A1 | 8/2012 |

OTHER PUBLICATIONS

Office Action to the corresponding Taiwan Patent Application rendered by the Taiwan Intellectual Property Office (TIPO) on Oct. 24, 2016, 9 pages (including English translation).

*Primary Examiner* — Chi H Pham
*Assistant Examiner* — Soon-Dong D Hyun
(74) *Attorney, Agent, or Firm* — Skaar Ulbrich Macari, P.A.

(57) ABSTRACT

A rendezvous flow control apparatus, method, and non-transitory tangible computer readable medium thereof are provided. The rendezvous flow control apparatus includes a plurality of transceiving interfaces and a processing unit. Each of the transceiving interfaces is individually assigned with a first allocated bandwidth. The transceiving interfaces transmit a first data flow of a network service to a network apparatus by the first allocated bandwidths at a first stage. The transceiving interfaces receive a piece of feedback information from the network apparatus. The processing unit assigns a second allocated bandwidth to each of the transceiving interfaces according to the piece of feedback information. The transceiving interfaces transmit a second data flow of the network service to the network apparatus by the second allocated bandwidths at a second stage.

17 Claims, 6 Drawing Sheets

(56) References Cited

U.S. PATENT DOCUMENTS

| | | | |
|---|---|---|---|
| 2004/0066785 A1* | 4/2004 | He | H04L 12/5601 370/395.21 |
| 2005/0276263 A1 | 12/2005 | Suetsugu et al. | |
| 2007/0268829 A1* | 11/2007 | Corwin | H04L 47/10 370/235 |
| 2008/0247314 A1* | 10/2008 | Kim | H04L 12/5695 370/235 |
| 2013/0088955 A1* | 4/2013 | van den Berg | H04L 47/2433 370/230 |
| 2014/0010233 A1* | 1/2014 | Takase | H04L 69/24 370/392 |
| 2014/0022901 A1* | 1/2014 | Suzuki | H04L 49/15 370/235 |
| 2015/0036659 A1* | 2/2015 | Vesterinen | H04W 16/08 370/331 |
| 2015/0350083 A1* | 12/2015 | Goodson | H04L 47/12 370/236 |

\* cited by examiner

| Feedback information from last time period | Transmitted sub-data flows | Allocated bandwidths of transceiving interface 123 | Allocated bandwidths of transceiving interface 125 | Estimated total bandwidth allocation amount |
|---|---|---|---|---|
| No | Sub-data flows 102a, 102b | 10 Mbps | 10 Mbps | 20 Mbps |
| Third level (inferior to the average) | Sub-data flows 104a, 104b | 15 Mbps | 20 Mbps | 35 Mbps |
| Third level (inferior to the average) | Sub-data flows 106a, 106b | 18 Mbps | 27 Mbps | 45 Mbps |
| Second level (the average) | Sub-data flows 108a, 108b | 20 Mbps | 30 Mbps | 50 Mbps |
| First level (superior to the average) | Sub-data flows 110a, 110b | 20 Mbps | 30 Mbps | 50 Mbps |

FIG. 1C

| | Feedback information from last time period | Allocated bandwidths of transceiving interface 123 | Allocated bandwidths of transceiving interface 125 | Estimated total bandwidth allocation amount |
|---|---|---|---|---|
| First network service | No | 10 Mbps | 10 Mbps | 20 Mbps |
| Second network service | No | 20 Mbps | 20 Mbps | 40 Mbps |
| First network service | Third level (inferior to the average) | 15 Mbps | 20 Mbps | 35 Mbps |
| Second network service | First level (superior to the average) | 10 Mbps | 15 Mbps | 35 Mbps |
| First network service | Third level (inferior to the average) | 18 Mbps | 27 Mbps | 45 Mbps |
| Second network service | First level (superior to the average) | 7 Mbps | 13 Mbps | 20 Mbps |
| First network service | Second level (the average) | 20 Mbps | 30 Mbps | 50 Mbps |
| Second network service | Second level (the average) | 5 Mbps | 10 Mbps | 15 Mbps |
| First network service | First level (superior to the average) | 20 Mbps | 30 Mbps | 50 Mbps |
| Second network service | Second level (the average) | 5 Mbps | 10 Mbps | 15 Mbps |

RENDEZVOUS FLOW CONTROL APPARATUS, METHOD, AND NON-TRANSITORY TANGIBLE COMPUTER READABLE MEDIUM

PRIORITY

This application claims priority to Taiwan Patent Application No. 104116905 filed on May 27, 2015, which is hereby incorporated herein by reference in its entirety.

FIELD

The present invention relates to a rendezvous flow control apparatus, a rendezvous flow control method, and a non-transitory tangible computer readable medium thereof. More particularly, the present invention relates to a rendezvous flow control apparatus, a rendezvous flow control method, and a non-transitory tangible computer readable medium thereof that update allocated bandwidths of a plurality of transceiving interfaces according to feedback information.

BACKGROUND

As a result of the advancement of the network technologies, network systems of various types and scales have been developed. Small-scale heterogeneous network systems (e.g., home network systems) are just one kind of network system that have experienced rapid development over recent years. A small-scale heterogeneous network system comprises a limited number of network apparatuses, but often comprises various different kinds of network apparatuses (e.g., set top boxes, smart TVs, tablet computers, smartphones, digital video players, and notebook computers). Network communication standards supported by these network apparatuses are not all the same (i.e., the interface types of the transceiving interfaces of these network apparatuses are not all the same) and some of the network apparatuses comprise a plurality of transceiving interfaces. For example, it is possible that in a small-scale heterogeneous network system, some of the network apparatuses have Power Line Communication (PLC) interfaces and Wi-Fi interfaces while other network apparatuses have Ethernet interfaces and Multimedia over Coax Alliance (MoCA) interfaces. Currently, protocols for integrating such different interfaces have been available (e.g., the IEEE 1905.1 Standard, the IEEE 1905.1a Standard, and the ITU-T G.hn protocol) and these protocols can collect transmission information of interface types of the transceiving interfaces in the lower layers.

As mentioned, in a small-scale heterogeneous network system, users can connect to the network by different network apparatuses based on different network communication standards. An issue that comes along with a small-scale heterogeneous network system is how to satisfy the demands of the users for various network transmission statuses in a small-scale heterogeneous network system. For example, how to make the quality of service (QoS) of network transmission meet the levels set by the users. This issue has been discussed for the conventional network systems (i.e., homogeneous network systems). For example, currently technologies such as integrated service and differentiated service have been developed to meet the particular QoS. However, this issue has not been fully discussed in the field of small-scale heterogeneous network systems due to the network apparatuses comprised in the small-scale heterogeneous network system being diversified and the protocols adopted by these network apparatuses for communication being diversified as well.

Accordingly, how to satisfy the demands for various network transmission statuses in a small-scale heterogeneous network system from the users is still an important topic in this field.

SUMMARY

Provided is a rendezvous flow control apparatus for a heterogeneous network system. The rendezvous flow control apparatus comprises a plurality of transceiving interfaces and a processing unit, wherein the processing unit is electrically connected to the transceiving interfaces. Each of the transceiving interfaces is assigned a first allocated bandwidth individually. The transceiving interfaces transmit a first data flow of a network service to a network apparatus by the first allocated bandwidths at a first stage. The transceiving interfaces receive a piece of feedback information from the network apparatus. The processing unit assigns a second allocated bandwidth to each of the transceiving interfaces according to the piece of feedback information. The transceiving interfaces further transmit a second data flow of the network service to the network apparatus by the second allocated bandwidths at a second stage.

Also provided is a rendezvous flow control method for a first network apparatus of a heterogeneous network system. The first network apparatus comprises a plurality of transceiving interfaces, wherein each of the transceiving interfaces is assigned a first allocated bandwidth individually. The rendezvous flow control method comprises the following steps: (a) transmitting, by the transceiving interfaces, a first data flow of a network service to a second network apparatus by the first allocated bandwidths at a first stage, (b) receiving, by the transceiving interfaces, a piece of feedback information from the second network apparatus, (c) assigning a second allocated bandwidth to each of the transceiving interfaces according to the piece of feedback information, and (d) transmitting, by the transceiving interfaces, a second data flow of the network service to the second network apparatus by the second allocated bandwidths at a second stage.

Further provided is a non-transitory tangible computer readable medium, which is stored with a computer program. The computer program executes a rendezvous flow control method after being loaded into a first network apparatus of a heterogeneous network system. The first network apparatus comprises a plurality of transceiving interfaces, wherein each of the transceiving interfaces is assigned a first allocated bandwidth individually. The rendezvous flow control method comprises the following steps of: (a) transmitting, by the transceiving interfaces, a first data flow of a network service to a second network apparatus by the first allocated bandwidths at a first stage, (b) receiving, by the transceiving interfaces, a piece of feedback information from the second network apparatus, (c) assigning a second allocated bandwidth to each of the transceiving interfaces according to the piece of feedback information, and (d) transmitting, by the transceiving interfaces, a second data flow of the network service to the second network apparatus by the second allocated bandwidths at a second stage.

According to the rendezvous flow control mechanism, a network apparatus (or a rendezvous flow control apparatus) transmits data flows via a plurality of transceiving interfaces thereof. Briefly speaking, each of the transceiving interfaces of the network apparatus is assigned an allocated bandwidth individually and each of the transceiving interfaces individually transmits the data flow that required to be transmitted by the allocated bandwidth. The network apparatus updates the allocated bandwidths of the transceiving interfaces according to various pieces of feedback information and then transmits the data flows that have not been transmitted by the updated allocated bandwidths. When updating the allocated bandwidths used by the transceiving interfaces, the network apparatus may take various factors (e.g., the difference between a current transmission level and a target transmission level, the weight values of the transceiving interfaces, etc) into consideration to decide the updated allocated bandwidths. In this way, the rendezvous flow control mechanism of the present invention can provide network service in a way that better meets the demands of the users. In the meantime, the network of the heterogeneous network system can be used more efficiently.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the rendezvous flow control apparatus, the rendezvous flow control method, and the non-transitory tangible computer readable medium thereof will be explained with reference to certain example embodiments thereof. However, these example embodiments are not intended to limit the present invention to any specific examples, embodiments, environment, applications, or particular implementations described in these embodiments. Therefore, description of these example embodiments is only for purpose of illustration rather than to limit the present invention. It should be appreciated that elements unrelated to the present invention are omitted from depiction in the following embodiments and the attached drawings.

Figure 1A:
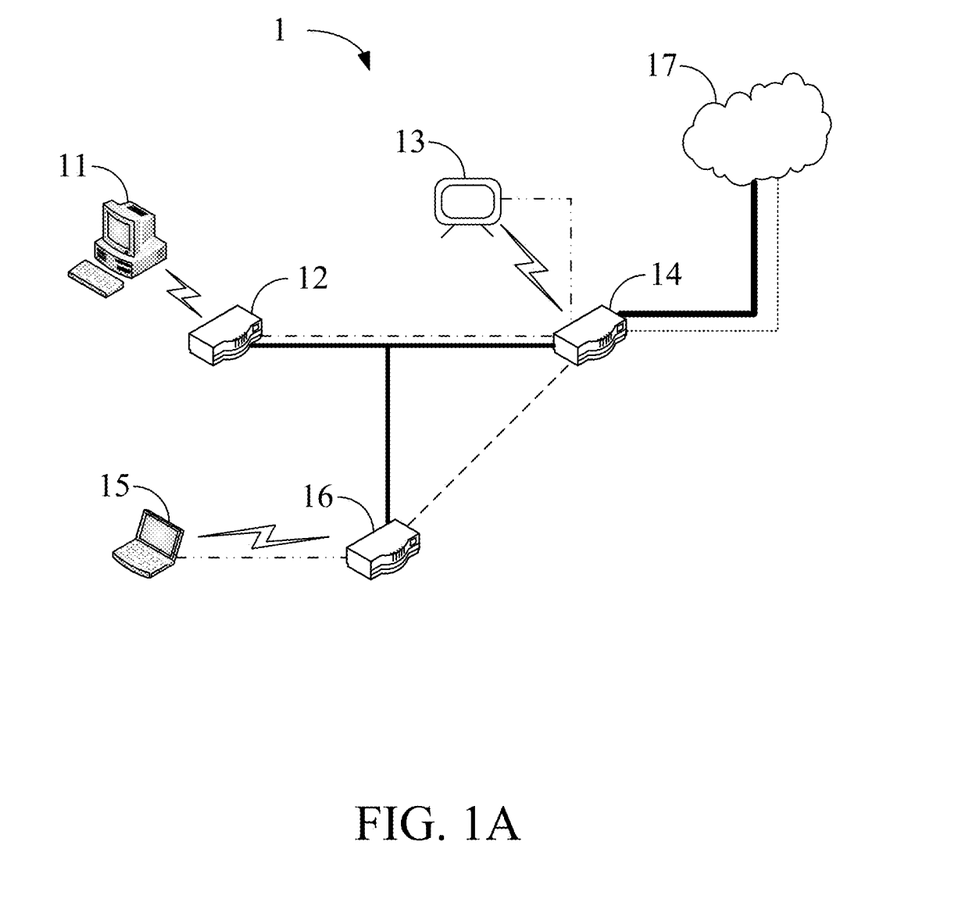
FIG. 1A is a schematic view depicting a topological structure of a heterogeneous network system 1.

A first embodiment of the present invention is a heterogeneous network system 1 (e.g., a home network) and a topological structure of which is depicted in FIG. 1A. The heterogeneous network system 1 comprises three electronic devices 11, 13, and 15 and three rendezvous flow control apparatuses 12, 14, and 16, wherein the flow control apparatus 14 is connected to the Internet 17. It shall be appreciated that the present invention does not limit the number of the electronic devices and the number of the rendezvous flow control apparatuses comprised in a heterogeneous network system.

Each of the electronic devices 11, 13, and 15 is an electronic device that requires network transmission, e.g., a desktop computer, a TV, or a notebook computer. Each of the rendezvous flow control apparatuses 12, 14, and 16 may be a bridge, a router, a gateway, or other apparatuses capable of forwarding network packets. Each of the electronic devices 11, 13, and 15 and the rendezvous flow control apparatuses 12, 14, and 16 may be regarded as a network apparatus in the heterogeneous network system 1. In FIG. 1A, any two network apparatuses connected to each other by a straight line (including solid lines and broken lines having different thicknesses and different types) are neighboring network apparatuses to each other. In addition, different thicknesses and different types of the straight lines represent communication links adopting different communication standards.

In this embodiment, each of the rendezvous flow control apparatuses 12, 14, and 16 has a plurality of transceiving interfaces, wherein each of the transceiving interfaces has an interface type. For example, the interface types may include Power Line Communication (PLC) interfaces, Wi-Fi interfaces, Ethernet interfaces, Multimedia over Coax Alliance (MoCA) interfaces, or other interfaces with communication functionality. It shall be appreciated that the present invention does not require that each of the rendezvous flow control apparatuses in a heterogeneous network system has to comprise a plurality of transceiving interfaces. As long as at least one rendezvous flow control apparatus comprises a plurality of transceiving interfaces, the technology disclosed in the present invention can be applied to the at least one rendezvous flow control apparatus.

In this embodiment, the rendezvous flow control apparatuses 12, 14, and 16 operate similarly in terms of bandwidth allocation and the consequent flow control of network transmission. Thus, the following descriptions will be focused on the details of the bandwidth allocation performed by the rendezvous flow control apparatus 12. How the rendezvous flow control apparatuses 14 and 16 operate to allocate the bandwidths and thereby control the network transmission flow shall be readily appreciated by those of ordinary skill in the art based on the following description of the rendezvous flow control apparatus 12.

Figure 1B:
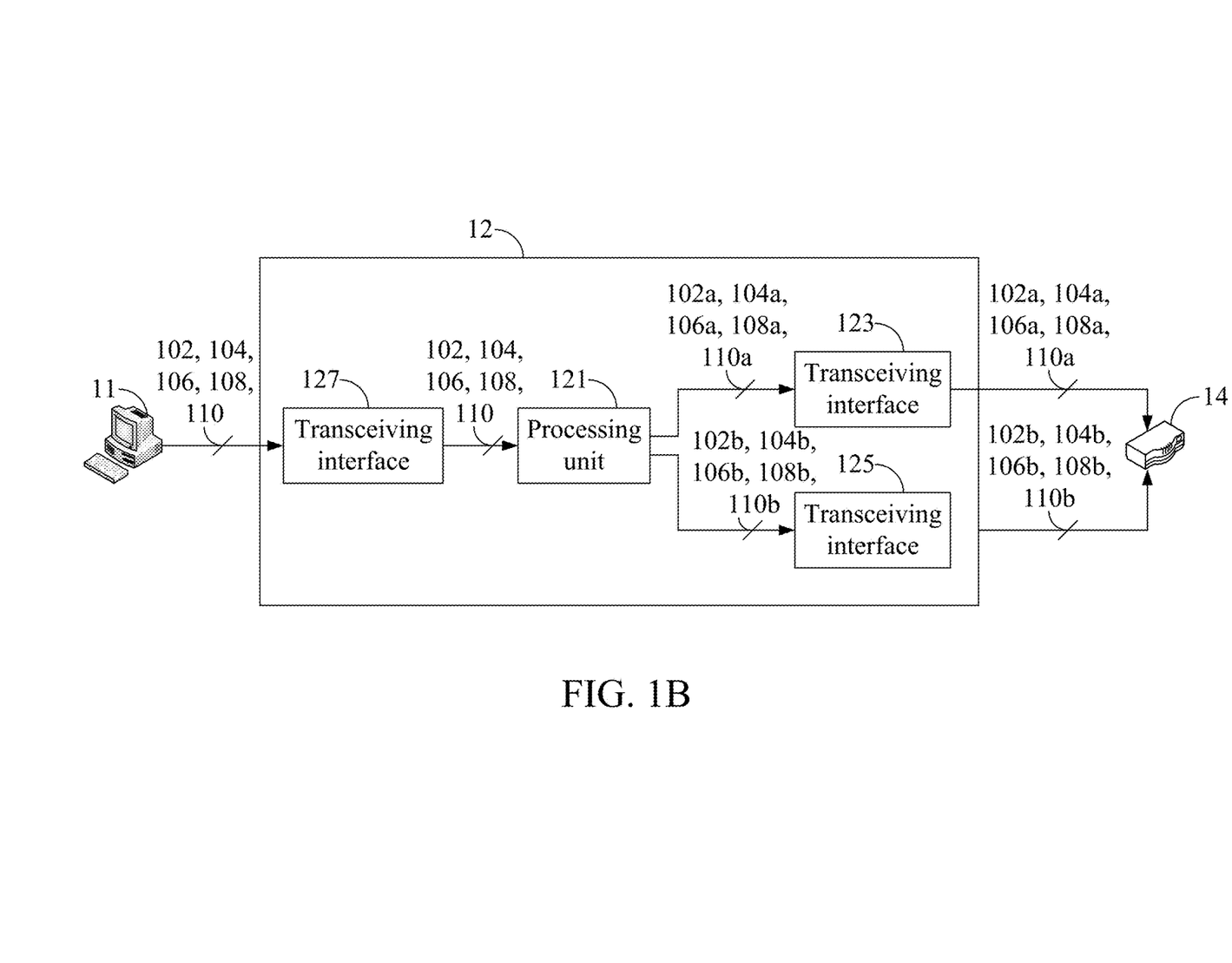
FIG. 1B is a schematic structural view of a rendezvous flow control apparatus 12.

FIG. 1B is a schematic view of the rendezvous flow control apparatus 12 according to the first embodiment. The rendezvous flow control apparatus 12 comprises a processing unit 121 and three transceiving interfaces 123, 125, and 127, wherein the processing unit 121 is electrically connected with the transceiving interfaces 123, 125, and 127. The transceiving interfaces 123 and 125 are connected to the rendezvous flow control apparatus 14, while the transceiving interface 127 is connected to the electronic device 11. The processing unit 121 may be any of various processors, central processing units (CPUs), microprocessors, or other computing apparatuses known to those of ordinary skill in the art. The transceiving interface 123, 125, and 127 may be any interface capable of receiving and transmitting control signals and/or data either in a wired way or wirelessly. For example, the transceiving interface 123, 125, and 127 may be respectively a Power Line Communication (PLC) interface, an Ethernet interface, and a Wi-Fi interface.

In this embodiment, the rendezvous flow control apparatus 12 needs to transmit a plurality of data flows 102, 104, 106, 108, and 110 comprised in a network service (e.g., a multimedia video streaming service) to the rendezvous flow control apparatus 14. For example, this may occur when the electronic device 11 needs to provide the network service to the electronic device 13 via the rendezvous flow control apparatuses 12 and 14. Moreover, in this embodiment, the rendezvous flow control apparatus 12 needs to transmit the data flows 102, 104, 106, 108, and 110 at a target transmission level, which may be preset, set by the user, or set in other ways. The target transmission level may be associated with the transmission rate, the quality of service (QoS), and/or other transmission information of the network service.

If the network service is provided from the electronic device 11, the transceiving interface 127 of the rendezvous flow control apparatus 12 receives the data flows 102, 104, 106, 108, and 110 in sequence from the electronic device 11. The transceiving interfaces 123 and 125 of the rendezvous flow control apparatus 12 transmit the data flows 102, 104, 106, 108, and 110 in sequence to the rendezvous flow control apparatus 14. During the process of transmitting the data flows 102, 104, 106, 108 and 110 to the rendezvous flow control apparatus 14 by the rendezvous flow control apparatus 12, the transceiving interfaces 123 and 125 receive feedback information (not shown) from the rendezvous flow control apparatus 14. The rendezvous flow control apparatus 12 updates the allocated bandwidths used by the transceiving interfaces 123 and 125 according to the feedback information and then transmits the data flows that have not been transmitted yet by the updated allocated bandwidths. In this embodiment, the feedback information may comprise at least one piece of sub-feedback information, wherein each of the at least one piece of sub-feedback information may be a piece of subjective feedback information or objective feedback information. For example, the subjective feedback information may include a piece of client scoring information, while the objective feedback information may include a piece of actual bandwidth consumption information, a packet loss rate (PLR), and/or a quality of service (QoS) parameter. In this embodiment, the processing unit 121 of the rendezvous flow control apparatus 12 may decide a current transmission level (not shown) according to the feedback information. It shall be appreciated that each of the at least one piece of sub-feedback information may correspond to a weight value in some embodiments. In this case, the processing unit 121 may decide the current transmission level according to the at least one piece of sub-feedback information and the corresponding weight value. Then, the processing unit 121 decides the allocated bandwidths to be used by the transceiving interfaces 123 and 125 at the next stage according to the current transmission level and the aforesaid target transmission level.

Hereby, a specific example will be described. It is assumed that the transmission level is divided into a first level, a second level, and a third level in this embodiment. The first level is superior to the average, the second level is the average, and the third level is inferior to the average. Additionally, it is assumed that the target transmission level required by the user of the electronic device 13 is the first level. It shall be appreciated that the present invention does not limit the number of transmission levels and the transmission status may not be divided into different levels in other embodiments of the present invention.

Figure 1C:
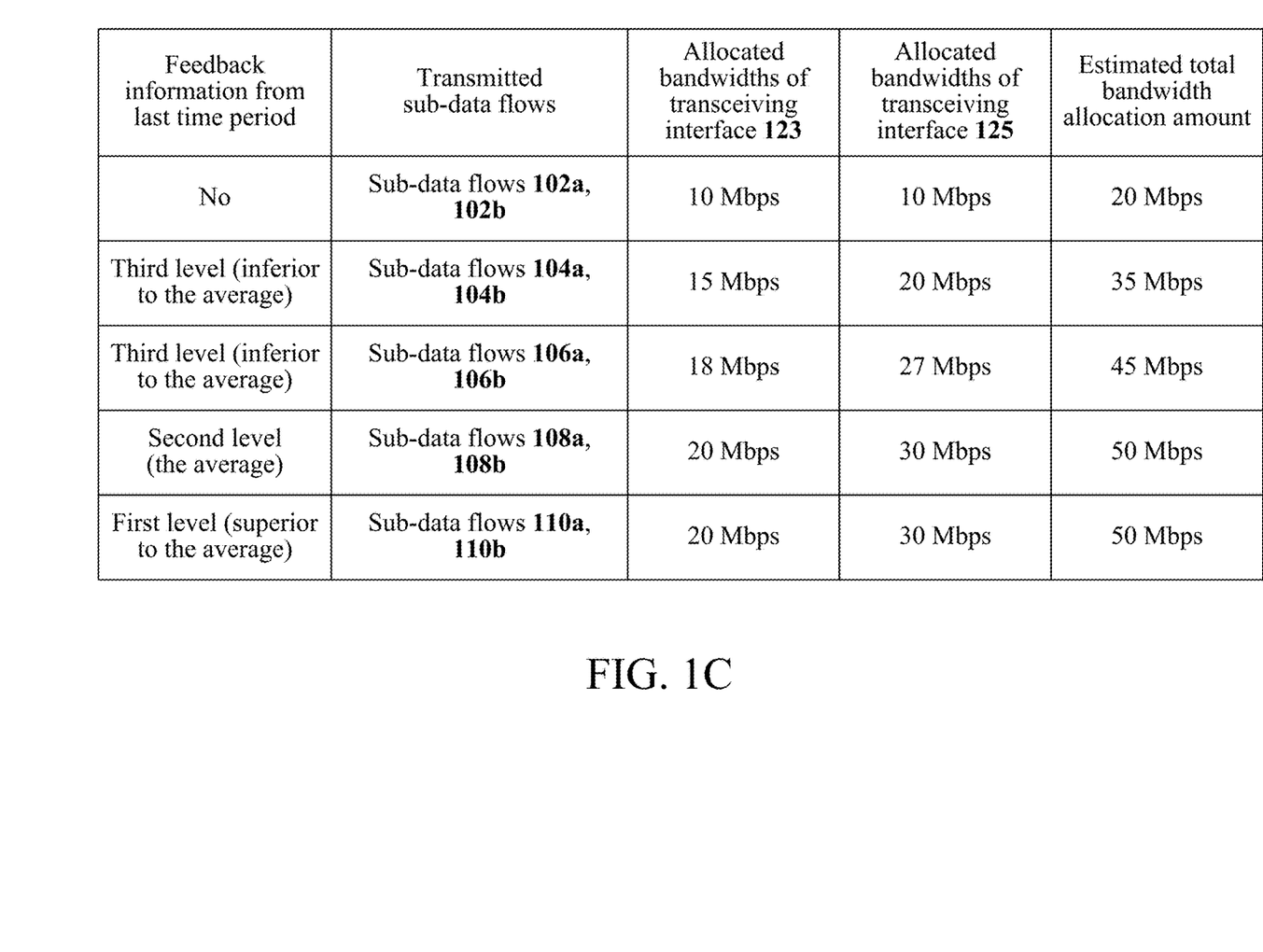
FIG. 1C depicts allocated bandwidths used by transceiving interfaces 123 and 125 at different stages.

Please refer to FIG. 1C as well, which illustrates the allocated bandwidths used by the transceiving interfaces 123 and 125 at different stages (i.e., the allocated bandwidths used for transmitting different data flows). First, the processing unit 121 assigns two allocated bandwidths (e.g., 10 Mbps and 10 Mbps) respectively to the transceiving interfaces 123 and 125 to transmit the data flow 102. Then, the data flow 102 is divided into sub-data flows 102a and 102b by the processing unit 121 so as to be transmitted via the transceiving interfaces 123 and 125 respectively. How the processing unit 121 performs the aforesaid allocation shall be appreciated by those of ordinary skill in the art, and thus will not be further described herein. Next, the transceiving interfaces 123 and 125 transmit the data flow 102 to the rendezvous flow control apparatus 14 by the aforesaid allocated bandwidths (i.e., 10 Mbps and 10 Mbps) at a first stage. In particular, the transceiving interface 123 transmits the sub-data flow 102a to the rendezvous flow control apparatus 14 by the aforesaid allocated bandwidth (i.e., 10 Mbps), while the transceiving interface 125 transmits the sub-data flow 102b to the rendezvous flow control apparatus 14 by the aforesaid allocated bandwidth (i.e., 10 Mbps).

Next, the transceiving interfaces 123 and 125 receive a piece of feedback information from the rendezvous flow control apparatus 14. The processing unit 121 assigns allocated bandwidths to be used by the transceiving interfaces 123 and 125 at a second stage (i.e., the allocated bandwidths used for transmitting the data flow 104) according to the piece of feedback information. Here, it is assumed that the processing unit 121 decides that the current transmission level is the third level (i.e., inferior to the average) according to the feedback information. Since the current transmission level is inferior to the target transmission level, the processing unit 121 increases the allocated bandwidths of the transceiving interfaces 123 and 125 (e.g., to 15 Mbps and 20 Mbps respectively). Then, the processing unit 121 divides the data flow 104 into sub-data flows 104a and 104b. At the second stage, the transceiving interfaces 123 and 125 respectively transmit the sub-data flows 104a and 104b to the rendezvous flow control apparatus 14 by the updated allocated bandwidths (e.g., the aforesaid 15 Mbps and 20 Mbps).

Since there are still other data flows (i.e., the data flows 106, 108, and 110) to be transmitted to the rendezvous flow control apparatus 14, the aforesaid operations will be repeated (i.e., the allocated bandwidths to be used by the transceiving interfaces 123 and 125 at the following stage are assigned again according to the piece of feedback information). Hereby, the example shown in FIG. 1C will be continued explained. After the sub-data flows 104a and 104b are transmitted, the transceiving interfaces 123 and 125 receive another piece of feedback information from the rendezvous flow control apparatus 14 and decide that the current transmission level is the third level (i.e., inferior to the average) according to the piece of feedback information. Since the current transmission level is inferior to the target transmission level, the processing unit 121 again increases the allocated bandwidths of the transceiving interfaces 123 and 125 (e.g., to 18 Mbps and 27 Mbps respectively). Then, the processing unit 121 divides the data flow 106 into sub-data flows 106a and 106b. At the next stage, the transceiving interfaces 123 and 125 respectively transmit the sub-data flows 106a and 106b to the rendezvous flow control apparatus 14 by the updated allocated bandwidths (i.e., the aforesaid 18 Mbps and 27 Mbps). After the sub-data flows 106a and 106b are transmitted, the transceiving interfaces 123 and 125 receive another piece of feedback information from the rendezvous flow control apparatus 14 and decide that the current transmission level is the second level (i.e., the average) according to the feedback information. Since the current transmission level is inferior to the target transmission level, the processing unit 121 again increases the allocated bandwidths of the transceiving interfaces 123 and 125 (e.g., to 20 Mbps and 30 Mbps respectively). Then, the processing unit 121 divides the data flow 108 into sub-data flows 108a and 108b. At the next stage, the transceiving interfaces 123 and 125 respectively transmit the sub-data flows 108a and 108b to the rendezvous flow control apparatus 14 by the updated allocated bandwidths (i.e., the aforesaid 20 Mbps and 30 Mbps). After the sub-data flows 108a and 108b are transmitted, the transceiving interfaces 123 and 125 receive another piece of feedback information from the rendezvous flow control apparatus 14 and decide that the current transmission level is the first level (i.e., superior to the average) according to the piece of feedback information. Since the current transmission level is consistent with the target transmission level, the processing unit 121 does not change the allocated bandwidths of the transceiving interfaces 123 and 125. Next, the processing unit 121 divides the data flow 110 into sub-data flows 110a and 110b. At the next stage, the transceiving interfaces 123 and 125 respectively transmit the sub-data flows 110a and 110b to the rendezvous flow control apparatus 14 by the same allocated bandwidths (i.e., the aforesaid 20 Mbps and 30 Mbps).

As mentioned, the present invention does not limit the number of transmission levels. According to the above descriptions, how the rendezvous flow control apparatus of the present invention adjusts the allocated bandwidths according to the piece of feedback information when the number of transmission levels varies shall be readily appreciated by those of ordinary skill in the art, and thus will not be further described. Moreover, in other embodiments of the present invention, the transmission status may not be divided into different levels and there may be no target transmission level. In these embodiments, the rendezvous flow control apparatus of the present invention may directly adjust the allocated bandwidths used for transmitting the data flows according to only the piece of feedback information (e.g., by comparing the piece of feedback information with a threshold value).

It shall be appreciated that, in other embodiments of the present invention, the processing unit 121 may take other factors into consideration when it assigns allocated bandwidths to be used by the transceiving interfaces 123 and 125 at the following stage according to the piece of feedback information. In particular, the processing unit 121 may enumerate a plurality of candidate bandwidth allocation combinations according to the current transmission level and the target transmission level. Each of the candidate bandwidth allocation combinations comprises a plurality of allocated bandwidths and each of the allocated bandwidths corresponds to one of the transceiving interfaces 123 and 125. The processing unit 121 calculates an estimated total bandwidth allocation amount for each of the candidate bandwidth allocation combinations. Furthermore, in some other embodiments, each of the transceiving interfaces 123 and 125 may correspond to a weight value and the processing unit 121 calculates the estimated total bandwidth allocation amount of each of the candidate bandwidth allocation combinations according to the weight values. Thereafter, the processing unit 121 decides the allocated bandwidths to be used by the transceiving interfaces 123 and 125 at the following stage according to the candidate bandwidth allocation combination that corresponds to the minimum estimated total bandwidth allocation amount.

It shall be appreciated that, in other embodiments of the present invention, the transceiving interfaces 123 and 125 may receive a plurality of bandwidth allocation records from other network apparatuses (e.g., the rendezvous flow control apparatuses 14 and 16, even further including the electronic devices 11, 13, and 15). Each of the bandwidth allocation records carries an allocated bandwidth and each of the allocated bandwidths corresponds to one of the transceiving interfaces 123 and 125. The processing unit 121 assigns the allocated bandwidths to be used by the transceiving interfaces 123 and 125 at the following stage according to the feedback information and the allocated bandwidths. Additionally, in order to allow other network apparatuses (e.g., the rendezvous flow control apparatuses 14 and 16, even further including the electronic devices 11, 13, and 15) to know the usage statuses of the transceiving interfaces 123 and 125 of the rendezvous flow control apparatus 12, the rendezvous flow control apparatus 12 also transmits a plurality of bandwidth allocation records via the transceiving interfaces 123 and 125. Each of the bandwidth allocation records carries the allocated bandwidth assigned by the processing unit 121 to the transceiving interfaces 123 and 125 individually.

As can be known from the above descriptions, when the rendezvous flow control apparatus 12 needs to transmit a plurality of data flows to the rendezvous flow control apparatus 14, it will transmit the data flows via a plurality of transceiving interfaces (i.e., the transceiving interfaces 123 and 125) connected with the rendezvous flow control apparatus 14. The transceiving interfaces 123 and 125 individually transmit the data flows that have to be transmitted by the allocated bandwidths assigned thereto. The rendezvous flow control apparatus 12 updates the allocated bandwidths used by the transceiving interfaces 123 and 125 according to various pieces of different feedback information. Then, the transceiving interfaces 123 and 125 individually transmit the data flows that have not been transmitted yet by the updated allocated bandwidths. Additionally, in the process of updating the allocated bandwidths used by the transceiving interfaces, the rendezvous flow control apparatus 12 may further take various factors (e.g., the difference between the current transmission level and the target transmission level, the weight values of the transceiving interfaces, etc) into consideration to decide the updated allocated bandwidths. The rendezvous flow control apparatuses 14 and 16 may operate in a similar way when they need to transmit a plurality of data flows. In this way, the rendezvous flow control apparatuses 12, 14, and 16 can provide network service in a way that better meets the demands of the users and, hence, the network of the heterogeneous network system 1 can be used more efficiently.

Figure 2:
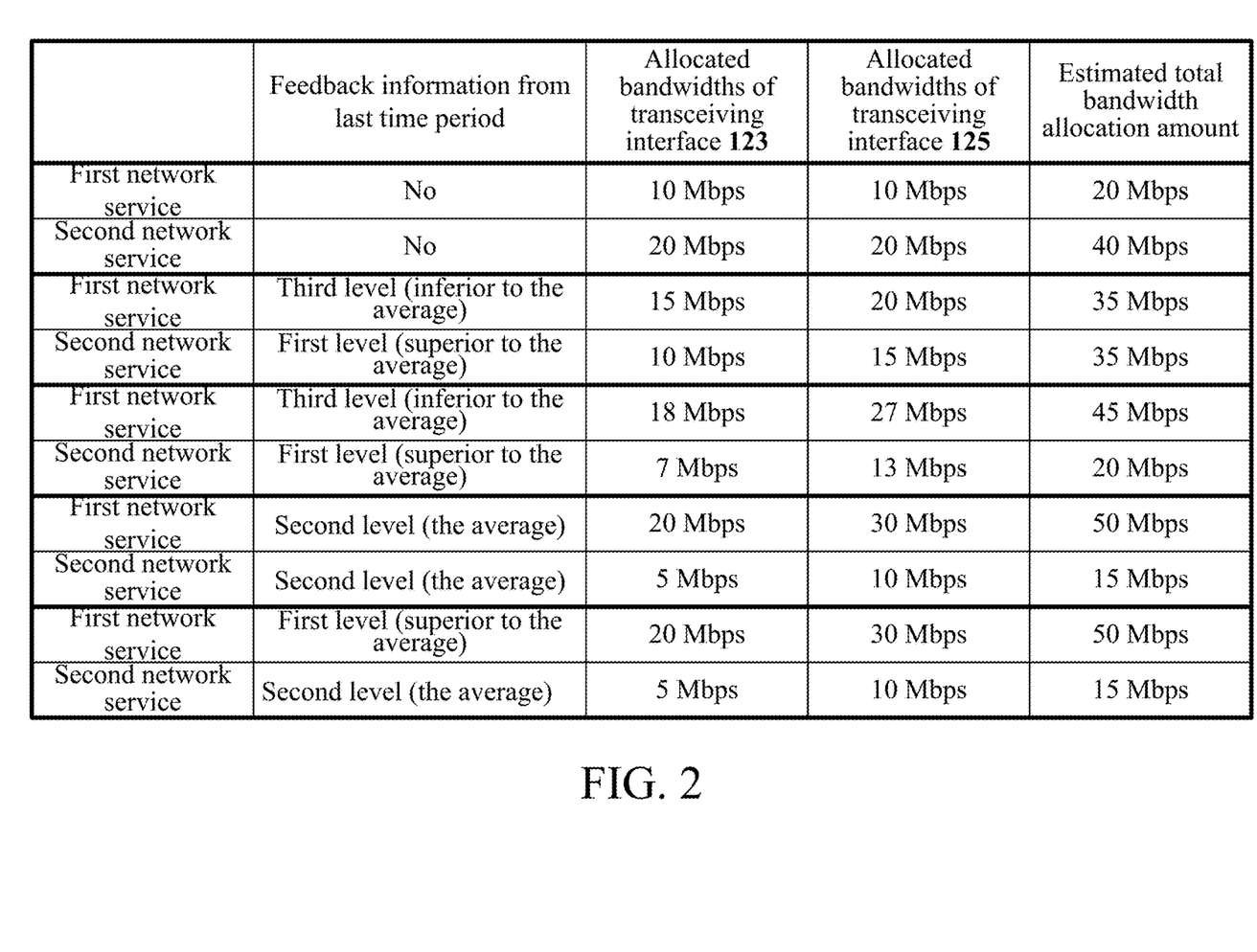
FIG. 2 depicts the allocated bandwidths used by the transceiving interfaces 123 and 125 at different stages.

Please refer to FIG. 1A, FIG. 1B, and FIG. 2 for a second embodiment of the present invention. Most operations performed in the second embodiment are similar to those performed in the first embodiment. However, in the second embodiment, the rendezvous flow control apparatus 12 needs to transmit the data flows of two network services to the rendezvous flow control apparatus 14. For ease of description, the two network services are respectively called a first network service and a second network service. For example, this may occur when the electronic device 11 needs to provide the first network service and the second network service to the electronic device 13 via the rendezvous flow control apparatuses 12 and 14. Moreover, in this embodiment, the rendezvous flow control apparatus 12 needs to provide the first network service to the rendezvous flow control apparatus 14 at a first target transmission level and provide the second network service to the rendezvous flow control apparatus 14 at a second target transmission level.

Hereby, a specific exemplary example will be described. It is assumed that the transmission level is divided into a first level, a second level and a third level in this embodiment. The first level is superior to the average, the second level is the average, and the third level is inferior to the average. Additionally, it is assumed that the first target transmission level is the first level and the second target transmission level is the second level.

FIG. 2 depicts the allocated bandwidths used by the transceiving interfaces 123 and 125 at different stages (i.e., the allocated bandwidths used for transmitting different data flows). At a first stage, the processing unit 121 respectively assigns two allocated bandwidths (e.g., 10 Mbps and 10 Mbps) to the transceiving interfaces 123 and 125 to transmit the data flows of the first network service and respectively assigns two allocated bandwidths (e.g., 20 Mbps and 20 Mbps) to the transceiving interfaces 123 and 125 to transmit the data flows of the second network service. Next, the transceiving interfaces 123 and 125 receive a piece of feedback information associated with the first network service and the second network service from the rendezvous flow control apparatus 14. Here, it is assumed that the processing unit 121 decides that the current transmission level of the first network service is the third level (i.e., inferior to the average) and the current transmission level of the second network service is the first level (i.e., superior to the average) according to the feedback information. As the current transmission level of the first network service is inferior to the target transmission level, the processing unit 121 increases the allocated bandwidths of the transceiving interfaces 123 and 125 for transmitting the first network service (e.g., to 15 Mbps and 20 Mbps respectively). On the other hand, since the current transmission level of the second network service is superior to the target transmission level thereof, the processing unit 121 decreases the allocated bandwidths of the transceiving interfaces 123 and 125 for transmitting the second network service (e.g., to 10 Mbps and 15 Mbps respectively).

If there are still other data flows of the first network service and/or the second network service to be transmitted, the rendezvous flow control apparatus 12 can repeat the aforesaid operations to update the allocated bandwidths used by the transceiving interfaces 123 and 125 for transmitting the first network service and the second network service. The aforementioned operations are repeated until all the data flows have been transmitted. How the rendezvous flow control apparatus 12 updates the allocated bandwidths shall be readily appreciated by those of ordinary skill in the art based on the descriptions of the aforesaid first embodiment and the second embodiment, and thus will not be further described herein.

One thing should be mentioned. Since the rendezvous flow control apparatus 12 transmits data flows of several different network services, a sum of the allocated bandwidths corresponding to the transceiving interface 123 should not be greater than the bandwidth capacity of the transceiving interface 123 and a sum of the allocated bandwidths corresponding to the transceiving interface 125 should not be greater than the bandwidth capacity of the transceiving interface 125 at any stage. For example, if the bandwidth capacity of the transceiving interface 123 is 30 Mbps, a sum of the allocated bandwidths assigned by the rendezvous flow control apparatus 12 to the transceiving interface 123 for transmitting the first network service and the second network service should not be greater than 30 Mbps at any stage. As another example, if the bandwidth capacity of the transceiving interface 125 is 40 Mbps, a sum of the allocated bandwidths assigned by the rendezvous flow control apparatus 12 to the transceiving interface 125 for transmitting the first network service and the second network service should not be greater than 40 Mbps at any stage.

In addition to the aforesaid operations, the second embodiment can execute all the operations set forth in the first embodiment, have the same functions, and deliver the same technical effects as the first embodiment. How the second embodiment executes these operations, has the same functions, and delivers the same technical effects as the first embodiment will be readily appreciated by those of ordinary skill in the art based on the explanation of the first embodiment. Thus, the details are not further described herein.

According to the above descriptions, when the rendezvous flow control apparatus 12 needs to transmit the data flows comprised in several network services to the rendezvous flow control apparatus 14, it will transmit the data flows comprised in the network services via a plurality of transceiving interfaces (i.e., the transceiving interfaces 123 and 125) connected with the rendezvous flow control apparatus 14 as well. For each of the network services, the transceiving interfaces 123 and 125 individually transmit the data flows to be transmitted by the allocated bandwidths assigned thereto. The rendezvous flow control apparatus 12 updates the allocated bandwidths used by the transceiving interfaces 123 and 125 for each network service according to various pieces of different feedback information. Then, for each of the network services, the transceiving interfaces 123 and 125 individually transmit the data flows that have not been transmitted by the updated allocated bandwidths. In this embodiment, the rendezvous flow control apparatuses 14 and 16 may operate in the same way. In this way, when data flows comprised in several network services need to be transmitted, the rendezvous flow control apparatuses 12, 14, and 16 can provide network service in a way that better meets the demands of the users, and the network of the heterogeneous network system 1 can be used more efficiently.

Figure 3A:
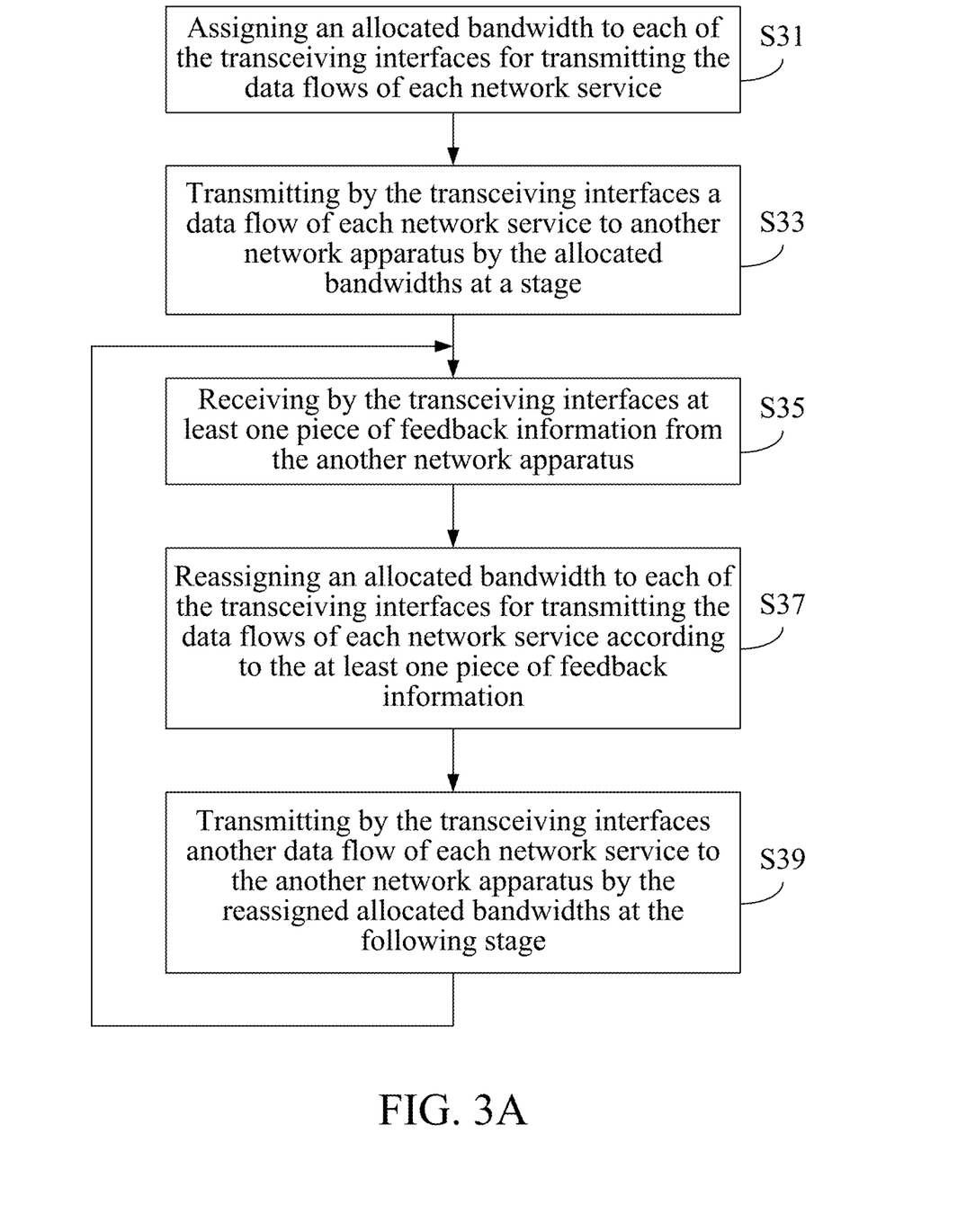
FIG. 3A is a flowchart diagram of a rendezvous flow control method according to a third embodiment of the present invention.

A third embodiment of the present invention is a rendezvous flow control method and a flowchart diagram of which is depicted in FIG. 3A. The rendezvous flow control method is used for a network apparatus in a heterogeneous network system (e.g., any of the rendezvous flow control apparatuses 12, 14, and 16 in the first embodiment). The network apparatus comprises a processing unit and a plurality of transceiving interfaces. In addition, the network apparatus needs to transmit data flows of at least one network service.

In the rendezvous flow control method, step S31 is firstly executed by the processing unit to assign an allocated bandwidth to each of the transceiving interfaces for transmitting the data flows of each network service. Then, step S33 is executed by the transceiving interfaces to transmit a data flow of each network service to another network apparatus by the allocated bandwidths at a stage. Next, step S35 is executed by the transceiving interfaces to receive at least one piece of feedback information from the another network apparatus. In this embodiment, the feedback information may comprise at least one piece of sub-feedback information. Each of the at least one piece of sub-feedback information may be a piece of subjective feedback information or objective feedback information. Each of the at least one piece of sub-feedback information may correspond to a weight value. For example, the subjective feedback information may include a piece of client scoring information and the objective feedback information may include a piece of actual bandwidth consumption information, a packet loss rate (PLR) and/or a quality of service (QoS) parameter. Thereafter, step S37 is executed by the processing unit to reassign an allocated bandwidth to each of the transceiving interfaces for transmitting the data flows of each network service according to the at least one piece of feedback information. In some embodiments, in the step S37, the allocated bandwidths may be further decided according to each of the at least one piece of sub-feedback information and the corresponding weight value. Then, step S39 is executed by the transceiving interfaces to transmit another data flow of each network service to the another network apparatus by the reassigned allocated bandwidths at the following stage.

In this embodiment, the rendezvous flow control method repeatedly (e.g., periodically) executes the step S35 to the step S39 so that the network apparatus can reassign the allocated bandwidth to each of the transceiving interfaces for transmitting the data flows of each network service according to the latest feedback information and then the transceiving interfaces transmit another data flow of each network service to the another network apparatus by the reassigned allocated bandwidths at the following stage. However, it shall be appreciated that the present invention does not limit the number of times that the steps S35 to S39 be executed. The requirement is that the step S35 to S39 be executed at least once.

It shall be appreciated that each of the transceiving interfaces has a bandwidth capacity. If the network apparatus needs to transmit the data flows of several network services and the bandwidth of each of the transceiving interfaces is allocated to the data flows of different network services, then a sum of the allocated bandwidths corresponding to each of the transceiving interfaces is not greater than the bandwidth capacity thereof at each stage.

Figure 3B:
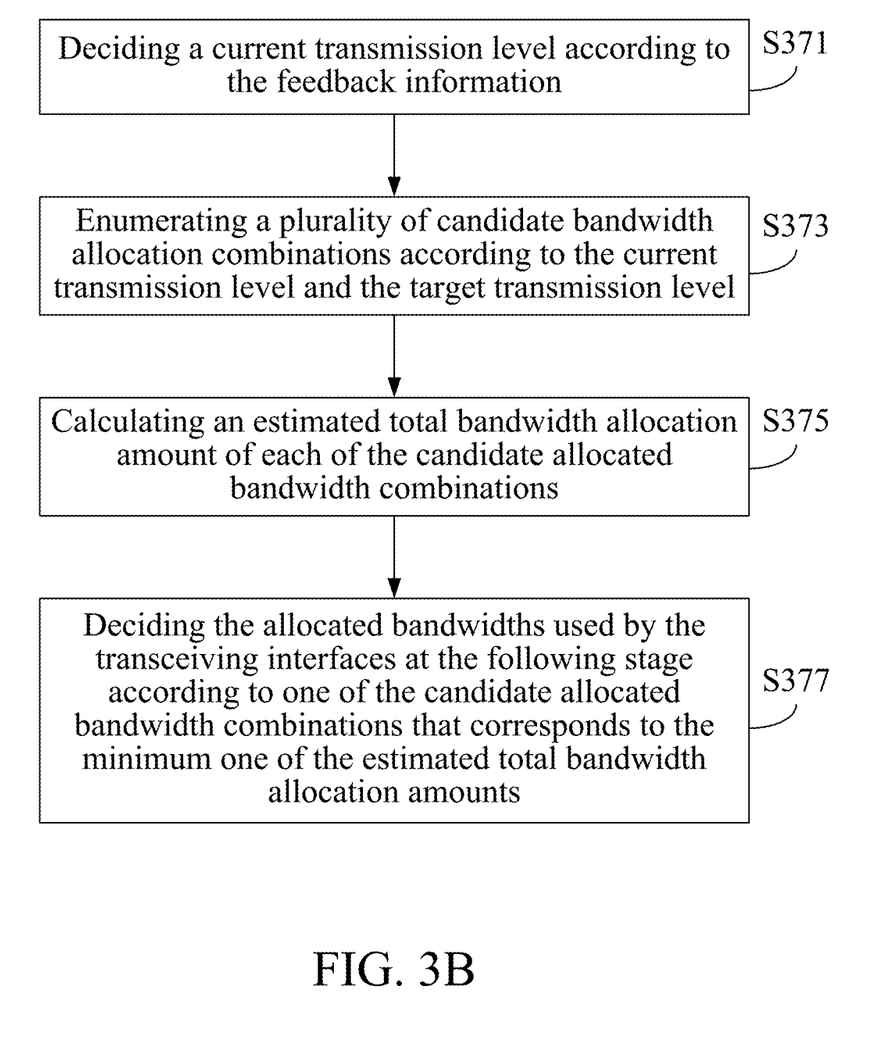
FIG. 3B is a flowchart diagram depicting the step S37 in detail.

It shall be appreciated that the step S37 may be realized by the steps depicted in FIG. 3B in some embodiments. In particular, step S371 is executed by the processing unit to decide a current transmission level according to the piece of feedback information. Then, the allocated bandwidths used by the transceiving interfaces for transmitting the data flows of each network service at the following stage are decided according to the current transmission level and a target transmission level. For example, in some embodiments, step S373 may be executed to enumerate a plurality of candidate bandwidth allocation combinations by the processing unit according to the current transmission level and the target transmission level. Then, step S375 may be executed by the processing unit to calculate an estimated total bandwidth allocation amount of each of the candidate bandwidth allocation combinations. It shall be appreciated that each of the transceiving interfaces corresponds to a weight value in some embodiments. In these embodiments, the estimated total bandwidth allocation amount of each of the candidate bandwidth allocation combinations is calculated according to the weight values in the step S375. Thereafter, step S377 may be executed to decide the allocated bandwidths used by the transceiving interfaces at the following stage according to the candidate bandwidth allocation combination that corresponds to the minimum estimated total bandwidth allocation amount.

It shall be appreciated that, in some embodiments of the present invention, the rendezvous flow control method may further executes another step (not shown) to receive a plurality of bandwidth allocation records from other network apparatuses by the transceiving interfaces. Each of the bandwidth allocation records carries an allocated bandwidth and each of the allocated bandwidths corresponds to one of the transceiving interfaces. In these embodiments, the allocated bandwidth used by each of the transceiving interfaces at the following stage is assigned according to the piece of feedback information and the allocated bandwidths in the step S37. Moreover, in some embodiments of the present invention, the rendezvous flow control method may executes another step (not shown) to transmit a plurality of bandwidth allocation records by the transceiving interfaces, wherein the bandwidth allocation records carry the allocated bandwidth of each of the transceiving interfaces. In this way, other network apparatuses can also know the usage statuses of the bandwidths of the transceiving interfaces.

In addition to the aforesaid steps, the third embodiment can also execute all the operations and steps set forth in the first and the second embodiments, have the same functions, and deliver the same technical effects as the first and the second embodiments. How the third embodiment executes these operations and steps, has the same functions, and delivers the same technical effects as the first and the second embodiments will be readily appreciated by those of ordinary skill in the art based on the explanation of the first and the second embodiments. Thus, the details are not repeated herein.

The rendezvous flow control method described in the third embodiment may be implemented by a computer program comprising a plurality of codes. The computer program is stored in a non-transitory tangible computer readable medium. After the codes of the computer program are loaded into a network apparatus (e.g., any of the rendezvous flow control apparatuses 12, 14, and 16 of the first and the second embodiments), the rendezvous flow control method of the third embodiment is executed by the computer program. The non-transitory tangible computer readable medium may be an electronic product, e.g., a read only memory (ROM), a flash memory, a floppy disk, a hard disk, a compact disk (CD), a mobile disk, a magnetic tape, a database accessible to networks, or any other storage media with the same function and well known to those of ordinary skill in the art.

It shall be appreciated that, in the specification of the present invention, the terms "first," "second," and "third" used in the first level, the second level, and the third level are only intended to distinguish these levels from each other. The terms "first" and "second" used in the first network service and the second network service are only intended to distinguish the network services from each other. The terms "first" and "second" used in the first stage and the second stage are only intended to distinguish the stages from each other. The terms "first" and "second" used in the first target transmission level and the second target transmission level are only intended to distinguish the target transmission levels from each other.

From the descriptions of the above embodiments, the rendezvous flow control apparatus according to the present invention comprises a plurality of transceiving interfaces. When the rendezvous flow control apparatus needs to transmit a plurality of data flows comprised in a network service, the transceiving interfaces individually transmit the data flows by the allocated bandwidths assigned thereto. The rendezvous flow control apparatus can update the allocated bandwidths used by the transceiving interfaces according to various pieces of different feedback information. Then, the rendezvous flow control apparatus transmits the data flows that have not been transmitted yet by the updated allocated bandwidths. In the process of updating the allocated bandwidths used by the transceiving interfaces, the rendezvous flow control apparatus may take various factors (e.g., the difference between the current transmission level and the target transmission level, the weight values of the transceiving interfaces, etc) into consideration to decide the updated allocated bandwidths. When the rendezvous flow control apparatus needs to transmit the data flows comprised in several network services, the rendezvous flow control apparatus will perform the aforesaid operations for each of the network services. In this way, the rendezvous flow control mechanism according to the present invention can provide network service in a way that better meets the demands of the users, and the network of the heterogeneous network system can be used more efficiently.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A rendezvous flow control apparatus for a heterogeneous network system, comprising:
   a plurality of transceiving interfaces, wherein each of the transceiving interfaces is assigned a first allocated bandwidth individually, the transceiving interfaces transmit a first data flow of a first network service to a network apparatus by the first allocated bandwidths at a first stage, and receive a piece of first feedback information from the network apparatus; and
   a processing unit, being electrically connected to the transceiving interfaces and configured to assign a second allocated bandwidth to each of the transceiving interfaces according to the piece of first feedback information;
   wherein the transceiving interfaces further transmit a second data flow of the first network service to the network apparatus by the second allocated bandwidths at a second stage;
   wherein the piece of first feedback information comprises at least one piece of sub-feedback information, each of the at least one piece of sub-feedback information is one of a piece of client scoring information, a piece of actual bandwidth consumption information, a quality of service (QoS) parameter, and the combination thereof, and each of the at least one piece of sub-feedback information corresponds to a weight value.

2. The rendezvous flow control apparatus of claim 1, wherein each of the transceiving interfaces is further assigned a third allocated bandwidth individually, the transceiving interfaces transmit a third data flow of a second network service to the network apparatus by the third allocated bandwidths at the first stage, the transceiving interfaces receive a piece of second feedback information from the network apparatus, the processing unit further assigns a fourth allocated bandwidth to each of the transceiving interfaces according to the piece of second feedback information, and the transceiving interfaces further transmit a fourth data flow to the network apparatus by the fourth allocated bandwidths at the second stage.

3. The rendezvous flow control apparatus of claim 2, wherein each of the transceiving interfaces has a bandwidth capacity, a sum of the first allocated bandwidth and the third allocated bandwidth corresponding to each of the transceiving interfaces is not greater than the bandwidth capacity, and a sum of the second allocated bandwidth and the fourth allocated bandwidth corresponding to each of the transceiving interfaces is not greater than the bandwidth capacity.

4. The rendezvous flow control apparatus of claim 1, wherein the processing unit further decides a current transmission level according to the first feedback information and the processing unit decides the second allocated bandwidths according to the current transmission level and a target transmission level.

5. The rendezvous flow control apparatus of claim 4, wherein the processing unit further enumerates a plurality of candidate bandwidth allocation combinations according to the current transmission level and the target transmission level, the processing unit further calculates an estimated total bandwidth allocation amount of each of the candidate bandwidth allocation combinations, and the processing unit decides the second allocated bandwidths according to the candidate bandwidth allocation combination that corresponds to the minimum estimated total bandwidth allocation amount.

6. The rendezvous flow control apparatus of claim 5, wherein each of the transceiving interfaces corresponds to a weight value and the processing unit calculates the estimated total bandwidth allocation amount of each of the candidate bandwidth allocation combinations according to the weight values.

7. The rendezvous flow control apparatus of claim 1, wherein the transceiving interfaces further transmit a plurality of bandwidth allocation records and each of the bandwidth allocation records carries one of the first allocated bandwidths.

8. The rendezvous flow control apparatus of claim 1, wherein the transceiving interfaces further receive a plurality of bandwidth allocation records, each of the bandwidth allocation records carries an allocated bandwidth, each of the allocated bandwidths corresponds to one of the transceiving interfaces, and the processing unit assigns a second allocated bandwidth to each of the transceiving interfaces according to the first feedback information and the allocated bandwidths.

9. A rendezvous flow control method for a first network apparatus of a heterogeneous network system, the first network apparatus comprising a plurality of transceiving interfaces, each of the transceiving interfaces being assigned a first allocated bandwidth individually, and the rendezvous flow control method comprising the following steps of:
   (a) transmitting, by the transceiving interfaces, a first data flow of a first network service to a second network apparatus by the first allocated bandwidths at a first stage;
   (b) receiving, by the transceiving interfaces, a piece of first feedback information from the second network apparatus;
   (c) assigning a second allocated bandwidth to each of the transceiving interfaces according to the piece of first feedback information; and
   (d) transmitting, by the transceiving interfaces, a second data flow of the first network service to the second network apparatus by the second allocated bandwidths at a second stage;
   wherein the piece of first feedback information comprises at least one piece of sub-feedback information, each of the at least one piece of sub-feedback information is one of a piece of client scoring information, a piece of actual bandwidth consumption information, a quality of service (QoS) parameter, and the combination thereof, and each of the at least one piece of sub-feedback information corresponds to a weight value.

10. The rendezvous flow control method of claim 9, wherein each of the transceiving interfaces is further assigned a third allocated bandwidth individually and the rendezvous flow control method further comprises the following steps of:

transmitting, by the transceiving interfaces, a third data flow of a second network service to the second network apparatus by the third allocated bandwidths at the first stage;

receiving, by the transceiving interfaces, a piece of second feedback information from the second network apparatus;

assigning a fourth allocated bandwidth to each of the transceiving interfaces according to the second feedback information; and transmitting, by the transceiving interfaces, a fourth data flow to the second network apparatus by the fourth allocated bandwidths at the second stage.

11. The rendezvous flow control method of claim 10, wherein each of the transceiving interfaces has a bandwidth capacity, a sum of the first allocated bandwidth and the third allocated bandwidth corresponding to each of the transceiving interfaces is not greater than the bandwidth capacity, and a sum of the second allocated bandwidth and the fourth allocated bandwidth corresponding to each of the transceiving interfaces is not greater than the bandwidth capacity.

12. The rendezvous flow control method of claim 9, wherein the step (c) further comprises the following steps of:
(c1) deciding a current transmission level according to the first feedback information; and
(c2) deciding the second allocated bandwidths according to the current transmission level and a target transmission level.

13. The rendezvous flow control method of claim 12, wherein the step (c2) further comprises the following steps of:
enumerating a plurality of candidate bandwidth allocation combinations according to the current transmission level and the target transmission level;
calculating an estimated total bandwidth allocation amount of each of the candidate bandwidth allocation combinations; and
deciding the second allocated bandwidths according to the candidate bandwidth allocation combination that corresponds to the minimum estimated total bandwidth allocation amount.

14. The rendezvous flow control method of claim 13, wherein each of the transceiving interfaces corresponds to a weight value and the estimated total bandwidth allocation amount of each of the candidate bandwidth allocation combinations is calculated according to the weight values.

15. The rendezvous flow control method of claim 9, further comprising the following step of:
transmitting, by the transceiving interfaces, a plurality of bandwidth allocation records, wherein each of the bandwidth allocation records carries one of the first allocated bandwidths.

16. The rendezvous flow control method of claim 9, further comprising the following steps of:
receiving, by the transceiving interfaces, a plurality of bandwidth allocation records, wherein each of the bandwidth allocation records carries an allocated bandwidth, and each of the allocated bandwidths corresponds to one of the transceiving interfaces; and
wherein the step (c) assigns the second allocated bandwidth to each of the transceiving interfaces according to the first feedback information and the allocated bandwidths.

17. A non-transitory tangible computer readable medium, being stored with a computer program, the computer program executing a rendezvous flow control method after being loaded into a first network apparatus of a heterogeneous network system, the first network apparatus comprising a plurality of transceiving interfaces, each of the transceiving interfaces being assigned a first allocated bandwidth individually, and the rendezvous flow control method comprising the following steps of:
(a) transmitting, by the transceiving interfaces, a first data flow of a first network service to a second network apparatus by the first allocated bandwidths at a first stage;
(b) receiving, by the transceiving interfaces, a piece of first feedback information from the second network apparatus;
(c) assigning a second allocated bandwidth to each of the transceiving interfaces according to the first feedback information; and
(d) transmitting, by the transceiving interfaces, a second data flow of the first network service to the second network apparatus by the second allocated bandwidths at a second stage;
wherein the piece of first feedback information comprises at least one piece of sub-feedback information, each of the at least one piece of sub-feedback information is one of a piece of client scoring information, a piece of actual bandwidth consumption information, a quality of service (QoS) parameter, and the combination thereof, and each of the at least one piece of sub-feedback information corresponds to a weight value.

* * * * *